United States Patent
Chiba et al.

(10) Patent No.: US 6,287,996 B1
(45) Date of Patent: Sep. 11, 2001

(54) CERAMIC COLOR COMPOSITION AND PROCESS FOR PRODUCING A CURVED GLASS PLATE

(75) Inventors: Jiro Chiba, Fukushima; Takaji Shimosaka, Chiba; Kenji Mukai, Fukushima; Shuji Taguchi, Fukushima; Mineyuki Ishida, Fukushima; Hitoshi Onoda, Kanagawa; Hiroshi Usui, Kanagawa; Tsuneo Manabe, Kanagawa, all of (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/393,169

(22) Filed: Sep. 10, 1999

(30) Foreign Application Priority Data

Sep. 14, 1998 (JP) .................................. 10-260245

(51) Int. Cl.$^7$ .............. C03C 8/14; C03C 8/12; C03C 8/04; C03C 14/00
(52) U.S. Cl. ................ 501/17; 501/20; 501/18; 501/23; 501/22; 501/25; 501/26; 501/32; 427/376.2; 428/428
(58) Field of Search ............... 501/17, 18, 20, 501/21, 22, 23, 25, 26, 32; 427/374.7, 376.2; 428/426, 428

(56) References Cited

U.S. PATENT DOCUMENTS

| | | |
|---|---|---|
| 4,407,868 | 10/1983 | Iizawa . |
| 4,615,987 * | 10/1986 | Chyung et al. .................... 501/32 |
| 4,777,092 | 10/1988 | Kawakami et al. . |
| 4,883,705 | 11/1989 | Kawakami et al. . |
| 5,179,047 | 1/1993 | Chiba . |
| 5,212,121 * | 5/1993 | Omata et al. ..................... 501/32 |
| 5,244,484 | 9/1993 | Chiba et al. . |
| 5,296,413 * | 3/1994 | Carroll et al. .................... 501/17 |
| 5,332,412 | 7/1994 | Manabe et al. . |
| 5,421,877 * | 6/1995 | Hayakawa et al. ................ 501/17 |
| 5,547,749 | 8/1996 | Chiba et al. . |
| 5,559,059 | 9/1996 | Ryan . |
| 5,578,533 | 11/1996 | Manabe et al. . |
| 5,618,764 | 4/1997 | Usui et al. . |
| 5,643,636 | 7/1997 | Usui et al. . |
| 5,714,420 * | 2/1998 | Sakoske et al. ................... 501/17 |
| 5,714,840 | 2/1998 | Tanabe et al. . |
| 5,817,586 | 10/1998 | Harada et al. . |

FOREIGN PATENT DOCUMENTS

| | | |
|---|---|---|
| 0 672 630 | 9/1995 | (EP) . |
| 60-176946 | 9/1985 | (JP) . |
| 2-212332 | 8/1990 | (JP) . |
| 3-112830 | 5/1991 | (JP) . |
| 8-34641 | 2/1996 | (JP) . |

OTHER PUBLICATIONS

Derwent Publications Ltd., Derwent Abstracts, AN 1994–313535, JP 06 239646, Aug. 30, 1994.

* cited by examiner

*Primary Examiner*—Michael Marcheschi
(74) *Attorney, Agent, or Firm*—Oblon, Spivak, McClelland, Maier & Neustadt, P.C.

(57) ABSTRACT

A ceramic color composition which comprises from 5 to 40 wt % of a heat-resistant color pigment powder, from 50 to 94.5 wt % of a glass powder, from 0 to 25 wt % of a refractory filler, and from 0.1 to 40 wt % of at least one whisker-like refractory filler selected from the group consisting of aluminum borate whiskers, α-alumina whiskers, potassium titanate whiskers, zinc oxide whiskers, $Na_2Ca_2P_2O_{18}$ whiskers, magnesium oxide whiskers, magnesium borate whiskers, basic magnesium sulfate ($MgSO_4.5MgO.8H_2O$) whiskers and titanium diboride whiskers.

8 Claims, No Drawings

CERAMIC COLOR COMPOSITION AND PROCESS FOR PRODUCING A CURVED GLASS PLATE

The present invention relates to a ceramic color composition and a process for producing a curved glass plate employing it, useful particularly for a window glass for automobiles.

Heretofore, a glass plate with a colored opaque layer for automobiles, obtained by printing a pasted ceramic color composition (ceramic color paste) around the periphery of a window glass for automobiles such as a front windshield glass, a side light glass, a back light glass or a roof glass, by screen printing following by drying, and by heating the glass plate to bake the ceramic color paste on the glass plate, has been widely used.

When this pasted ceramic color composition is baked around the periphery of a glass plate, it will form a colored opaque layer. The composition is used to prevent deterioration of a urethane sealant which holds the periphery of the window glass, due to ultraviolet rays, or to prevent the terminals of a heating wire equipped around the periphery of the window glass from being seen from the outside of the car. Further, in recent years, it is used to improve the appearance of the window glass, by forming a graded pattern of fine dots on a glass plate from the periphery toward the center by baking the ceramic color paste thereon.

As the ceramic color composition for such an application, one based on an amorphous glass powder which will not crystallize at the time of baking the glass, and one based on a crystalline glass powder which will crystallize at the time of baking the glass, having various heat-resistant pigments added thereto, are available. With respect to the ceramic color composition, as disclosed in Japanese Patent No. 2,748,647 and JP-A-6-256039, by using a glass (crystalline glass) which will crystallize at a temperature for the bending process of a glass plate, coating step of a so-called release agent and washing step after the bending processing can be omitted, whereby the production efficiency is significantly improved.

On the other hand, with the lightening of automobile components in recent years, it has been required to make the window glass for automobiles thin. However, there is a possible fear that the strength of the window glass for automobiles will decrease, or the strength of the glass plate against wind or coolness will be inadequate. It has been known that a glass plate with a colored opaque layer is usually poor in the strength as compared with a glass plate without the colored opaque layer. To overcome this problem, a method to decrease the coefficient of thermal expansion of said ceramic color composition has been known.

However, it is hard to apply this method to a case where the glass plate is made thin. The reason is that the bending temperature becomes low as the glass plate is made thin, and accordingly it is necessary to use a glass powder which will be fused at a lower temperature. Commonly, a glass powder which will be fused at a lower temperature has a higher coefficient of thermal expansion, and accordingly a glass powder which can be applied to the above method can hardly be available.

Further, it is necessary to bake the ceramic color composition on a glass plate during the bending processing of the glass plate by heating. Accordingly, the ceramic color composition is preferably a material which can be baked at a temperature of from 570 to 700° C., preferably from 600 to 700° C.

Further, in recent years, influences of acid rain due to environmental pollution are becoming significant, and accordingly, the problem is becoming significant, such that when a colored opaque layer formed by baking the ceramic color composition is used outside, acid rain will corrode the colored opaque layer, whereby the color of the layer will change. As the main component of the acids in acid rain is sulfuric acid, a ceramic color composition which gives a colored opaque layer excellent in sulfuric acid resistance, has been strongly desired.

On the other hand, as a bending processing for a window glass for automobiles, to improve productivity and to improve accuracy of the bending processing, a system called a bending processing in a furnace, has been employed, wherein a pressing apparatus or a adsorption shaping apparatus for bending is installed in a furnace, and the bending processing is carried out in the furnace. The bending processing (pressing bending processing) requiring a pressing apparatus, is usually followed by tempering processing. In the bending processing (bending processing by gravity) in which an adsorption shaping apparatus for bending is used, usually the tempering processing is not carried out.

In the pressing bending processing, if a ceramic color composition employing an amorphous glass powder having a low apparent viscosity is used, the ceramic color composition will adhere to a heat resistant cloth which is usually used for the surface of a pressing mold, such as a glass cloth or a stainless cloth, and so-called release properties will deteriorate, and thereby the productivity will decrease. Accordingly, it is necessary to use a crystalline glass powder having a high apparent viscosity for the ceramic color composition to be used.

Further, as a glass having a low melting point and having a relatively excellent sulfuric acid resistance, an amorphous bismuth-containing glass containing no lead, is available. However, this glass is poor in release properties, whereby productivity tends to be poor. Further, as a crystalline bismuth-containing glass has a high coefficient of thermal expansion, the strength of a glass plate having the ceramic color composition baked thereon will deteriorate, and with the increase in the content of bismuth, the sulfuric acid resistance will decrease.

Under such circumstances, it is an object of the present invention to overcome the above problems of prior art, and to provide a ceramic color composition with which the strength of a glass plate will not deteriorate, or the strength is less likely to decrease, and a process for producing a curved glass plate employing it.

The present invention provides a ceramic color composition which comprises from 5 to 40 wt % of a heat-resistant color pigment powder, from 50 to 94.5 wt % of a glass powder, from 0 to 25 wt % of a refractory filler, and from 0.1 to 40 wt % of at least one whisker-like refractory filler selected from the group consisting of aluminum borate whiskers, α-alumina whiskers, potassium titanate whiskers, zinc oxide whiskers, $Na_2Ca_2P_2O_{18}$ whiskers, magnesium oxide whiskers, magnesium borate whiskers, basic magnesium sulfate ($MgSO_4.5MgO.8H_2O$) whiskers and titanium diboride whiskers.

The present invention further provides a process for producing a curved glass plate, which comprises coating the ceramic color paste containing the above ceramic color composition on a predetermined portion of a glass plate, then heating the glass plate to bake the ceramic color paste on the glass plate, and forming the glass plate into a desired shape after or during the baking of the color paste.

In the present invention, 'an amorphous glass' is a glass which will not crystallize at a temperature of from 570 to 700° C., and 'a crystalline glass' is a glass which will crystallize at a temperature of from 570 to 700° C.

Now, the present invention will be explained in further detail with reference to preferred embodiments.

In order to keep the strength of a glass plate, the glass powder in inorganic components in the ceramic color composition of the present invention, is preferably one having heat properties such that it can be baked at a temperature at which a glass plate of soda lime silica glass which is commonly used for a window glass for automobiles is subjected to a bending processing. Namely, as the heat properties of the glass powder in inorganic components, the glass powder is required to soften and fluidize at a temperature lower than the temperature for bending processing of the glass plate.

Further, the glass powder may be one (crystalline glass) which will crystallize at the temperature for bending processing of the glass plate, or one (amorphous glass) which will not crystallize at the temperature. With respect to the composition, the glass powder may contain lead, or it may not contain lead. However, one containing no lead is preferred in view of an environmental load. When the colored opaque layer is required to have excellent release properties, in addition to keep the strength of the glass plate, it is preferred to use a crystalline glass powder as the glass powder. Further, the glass powder preferably contains no cadmium in view of an environmental load.

The content of the glass powder to be used for the ceramic color composition of the present invention is from 50 to 94.5 wt % based on the total amount of inorganic components in the composition. If it is less than 50 wt %, there is a possibility that the baking of the coated layer made of the above composition on a glass plate will deteriorate at the temperature for bending processing of the glass plate. Preferably it is at least 60 wt %. On the contrary, if it exceeds 94.5 wt %, the amount of the heat-resistant color pigment powder in the composition is relatively inadequate, and accordingly the desired color tone of the colored opaque layer may not be obtained, or a color-forming of the colored opaque layer may deteriorate. Preferably it is at most 80 wt %.

A preferred glass powder to be used in the present invention is a glass powder having substantially the following composition:

$SiO_2$: 10–45 wt %, ZnO: 10–25 wt %, $B_2O_3$: 0–15 wt %, $Bi_2O_3$: 15–40 wt %, $CeO_2$: 0–5 wt %, MgO: 0–5 wt %, CaO: 0–5 wt %, BaO: 0–5 wt %, $Li_2O$: 0–10 wt %, $Na_2O$: 0–10 wt %, $K_2O$: 0–10 wt %, $TiO_2$: 0–5 wt %, $ZrO_2$: 0–5 wt %, $Al_2O_3$: 0–5 wt %, and F: 0–2 wt %.

In the above composition, more preferred is a glass powder having substantially the following composition:

$SiO_2$: 28–38 wt %, ZnO: 13–23 wt %, $B_2O_3$: 8–14 wt %, $Bi_2O_3$: 20–30 wt %, $CeO_2$: 0–3 wt %, MgO: 0–3 wt %, CaO: 0–3 wt %, BaO: 0–3 wt %, MgO+CaO+BaO: 0–3 wt %, $Li_2O$: 0–5 wt %, $Na_2O$: 0–7 wt %, $K_2O$: 0–3 wt %, $Li_2O+Na_2O+K_2O$: 6–10 wt %, $TiO_2$: 0–4 wt %, $ZrO_2$: 0–3 wt %, $Al_2O_3$: 0–3 wt %, and F: 0–2 wt %.

Another preferred glass powder to be used in the present invention is a glass powder having substantially the following composition:

$SiO_2$: 10–45 wt %, ZnO: more than 25–45 wt %, $B_2O_3$: 0–10 wt %, $Bi_2O_3$: 15–40 wt %, $CeO_2$: 0–5 wt %, MgO: 0–5 wt %, CaO: 0–5 wt %, BaO: 0–5 wt %, $Li_2O$: 0–10 wt %, $Na_2O$: 0–10 wt %, $K_2O$: 0–10 wt %, $TiO_2$: 0–10 wt %, $ZrO_2$: 0–5 wt %, $Al_2O_3$: 0–5 wt %, and F: 0–2 wt %; and being crystalline.

In the above composition, more preferred is a glass powder having substantially the following composition:

$SiO_2$: 28–38 wt %, ZnO: 28–38 wt %, $B_2O_3$: 0–8 wt %, $Bi_2O_3$: 20–30 wt %, $CeO_2$: 0–3 wt %, MgO: 0–3 wt %, CaO: 0–3 wt %, BaO: 0–3 wt %, MgO+CaO+BaO: 0–3 wt %, $Li_2O$: 0–5 wt %, $Na_2O$: 0–7 wt %, $K_2O$: 0–3 wt %, $Li_2O+Na_2O+K_2O$: 4–8 wt %, $TiO_2$: 0–4 wt %, $ZrO_2$: 0–3 wt %, $Al_2O_3$: 0–3 wt %, and F: 0–2 wt %; and being crystalline. More preferably the glass powder deposits a crystal. of $Z_{1.7}SiO_4$.

Another preferred glass powder to be used in the present invention is a glass powder having substantially the following composition:

$SiO_2$: 10–36 wt %, $Bi_2O_3$: 50–75 wt %, $B_2O_3$: 0–8 wt %, BaO: 0–12 wt %, $CeO_2$: 0–2 wt %, $Li_2O$: 0–5 wt %, $Na_2O$: 0–5 wt %, $K_2O$: 0–3 wt % and $TiC_2$: 0–12 wt %; and being crystalline.

In the above composition, more preferred is a glass powder having substantially the following composition:

$SiO_2$: 25–30 wt %, ZnO: 0–2 wt %, $Bi_2O_3$: 58–66 wt %, $B_2O_3$: 0–4 wt %, BaO: 0–8 wt %, $CeO_2$: 0–2 wt %, $Li_2O$: 2–5 wt %, $Na_2O$: 0–3 wt %, $K_2O$: 0–2 wt % and $TiO_2$: 4–6 wt %;

and being crystalline. More preferably the glass powder deposits a crystal. of bismuth silicate.

Another preferred glass powder to be used in the present invention is a glass powder having substantially the following composition:

$SiO_2$: 10–40 wt %, ZnO: 0–10 wt %, $B_2O_3$: 0–15 wt %, PbO: 40–70 wt %, $CeO_2$: 0–2 wt %, MgO: 0–5 wt %, CaO: 0–5 wt %, BaO: 0–5 wt %, $Li_2O$: 0–5 wt %, $Na_2O$: 0–5 wt %, $K_2O$: 0–5 wt %, $TiO_2$: 0–5 wt %, $ZrO_2$: 0–5 wt %, $Al_2O_3$: 0–5 wt % and F: 0–2 wt %.

In the above composition, more preferred is a glass powder having substantially the following composition:

$SiO_2$: 23–37 wt. %, ZnO: 0–5 wt %, $B_2O_3$: 2–12 wt %, $Bi_2O_3$: 20–30 wt %, PbO: 43–67 wt %, $CeO_2$: 0–2 wt %, MgO: 0–3 wt %, CaO: 0–3 wt %, BaO: 0–3 wt %, MgO+CaO+BaO: 0–3 wt %, $Li_2O$: 0–2 wt %, $Na_2O$: 0–3 wt %, $K_2O$: 0–3 wt %, $Li_2O+Na_2O+K_2O$: 0.5–5 wt %, $TiO_2$: 0–4 wt %, $ZrO_2$: 0–3 wt %, $Al_2O_3$: 0–3 wt % and F: 0–2 wt %.

As the physical properties of the glass powder in the present invention, the softening point is preferably from 500 to 630° C., more preferably from 540 to 580° C. The coefficient of thermal expansion (average coefficient of linear expansion at a temperature of from 50 to 350° C.) is preferably from $40 \times 10^{-7}$/° C. to $120 \times 10^{-7}$/° C., more preferably from $70 \times 10^{-7}$/° C. to $100 \times 10^{-7}$/° C. The crystallization peak temperature of the crystalline glass powder in the present invention is preferably at most 700° C., more preferably at most 650° C.

The content of the heat-resistant color pigment powder to be used for the ceramic color composition of the present invention is from 5 to 40 wt % based on the total amount of inorganic components in the composition. If it is less than 5 wt %, the desired color tone can not be obtained. Preferably it is at least 15 wt %. If it exceeds 40 wt %, the amount of the glass powder in the composition tends to be relatively inadequate, whereby the baking on the glass plate tends to deteriorate. Preferably it is at most 35 wt %. The heat-resistant color pigment powder may, for example, be a pigment composed mainly of a copper-chrome oxide, an iron-manganese oxide or magnetite.

The whisker-like refractory filler to be used for the ceramic color composition of the present invention is a substantially effective component to improve the strength of the curved glass plate. The content is from 0.1 to 40 wt % based on the total amount of inorganic components in the composition. If it is less than 0.1 wt %, the amount may be too small, whereby desired glass strength may not be obtained. Preferably it is at least 0.5 wt %, more preferably at least 2 wt %. Further, if it exceeds 40 wt %, the amount of the glass powder or the amount of the heat-resistant color pigment powder tends to be relatively inadequate, whereby the baking of the colored opaque layer will deteriorate or the color-forming will deteriorate. Preferably it is at most 20 wt %.

As the whisker-like refractory filler, at least one whisker-like refractory filler selected from the group consisting of aluminum borate whiskers, α-alumina whiskers, potassium titanate whiskers, zinc oxide whiskers, $Na_2Ca_2P_2O_{18}$ whiskers, magnesium oxide whiskers, magnesium borate whiskers, basic magnesium sulfate ($MgSO_4.5MgO.8H_2O$) whiskers and titanium diboride whiskers, is used.

These whisker-like refractory fillers have such characteristics that at the timer of baking the ceramic color composition (570–650° C. for bending by gravity, and 630–700° C. for pressing bending), there is no blister, or the amount of the blisters is small. As other whisker-like refractory fillers, carbon whiskers, titanium nitride whiskers, and titanium carbide whiskers has, for example, been known. However, these whiskers significantly blister at the time of the above baking, whereby the colored opaque layer obtained by baking tends to be cloudy due to the blisters. The whiskers to be used in the present invention preferably has a modulus of elasticity of at least $28 \times 10^9$ kgf/cm². The whiskers having a modulus of elasticity of less than $28 \times 10^9$ kgf/cm², there is a fear that the increase in the strength of the glass plate will be small. From this viewpoint, aluminum borate whiskers, α-alumina whiskers, potassium titanate whiskers, zinc oxide whiskers and $Na_2Ca_2P_2O_{18}$ whiskers are preferred.

The whisker-like refractory filler is preferably needle crystals having a length of from about 0.5 to about 100 μm, and a diameter of from about 0.1 to about 10 μm.

In the present invention, the above whisker-like refractory filler includes all refractory fillers of the above specified whiskers in the above mentioned shape.

If the length is less than 0.5 μm, it may be too short, and no significant effect may be available. More preferably it is at least 5 μm. On the other hand, the length exceeds 100 μm, when the ceramic color composition of the present invention is used as a paste, it may cause clogging of the screen mesh in screen printing. Preferably it is at most 50 um. Further, if the diameter is less than 0.1 μm, the whisker-like refractory filler will be too expensive to produce. Preferably it is at least 0.3 μm. On the other hand, the diameter exceeds 10 μm, the effect is less likely to be obtained. Preferably it is at most 5 μm. The length and the diameter are measured from photographs of a great number of needle crystals by using an electron microscope.

The content of the refractory filler to be used for the ceramic color composition of the present invention is from 0 to 25 wt %. The refractory filler is different from the above-mentioned whisker-like refractory filler, and the refractory filler does not include whisker-like refractory fillers. The refractory filler may, for example, be α-alumina, α-quartz, zircon, cordierite, β-eucryptite, forsterite, mullite, steatite or lead titanate, with a purpose of controlling the coefficient of thermal expansion and fluidity of the composition during heating. The use of the refractory filler is not essential, and when it is used, the content is preferably at most 15 wt %. By using such a refractory filler, effects such as improvement in wear resistance of the baked colored opaque layer, can be obtained.

To the ceramic color composition of the present invention, a metal oxide or a metal boride may be added as a coloring agent or as a release agent, in an amount of at most 15 wt %; based on the total amount, although it is not essential. If the amount of the metal oxide or boride exceeds 15 wt %, the amount of the glass powder in the composition tends to be relatively inadequate, whereby the baking of the composition of the present invention on the glass plate at the temperature for bending processing, tends to be difficult, in some cases. The metal oxide or boride may, for example, be oxide or boride of Ni, Sn, Ti, Mn, Fe, Cu, Ag, La, Zr, Co, Mo, Cr or Ce.

It is preferred to use different ceramic color compositions of the present invention, depending upon the bending processing of the glass plate and/or the applications of the glass plates. For example, as a ceramic color composition to be used for a glass plate which is subjected to the bending processing of the glass plate by gravity, one employing a glass powder containing lead has conventionally been used. However, in recent years, a ceramic color composition containing no lead has been required in order to reduce a load on environment. In such a case, usually a tempering processing of the glass plate is not carried out. Accordingly, it is particularly strongly demanded to prevent the decrease in strength of the glass plate by baking the ceramic color composition. The ceramic color composition as defined in claim 3, meets the above requirements. It is particularly suitable as a ceramic color composition for a front windshield glass for automobiles, it contains no lead, and the bending processing by gravity can be carried out at a temperature of from 570 to 650° C.

Further, as a ceramic color composition to be used for a glass plate which is subjected to a pressing bending processing, as mentioned above, a ceramic color composition containing no lead, having a good release property, and preventing the decrease in strength of the glass plate at the time of baking, has been strongly demanded. The ceramic color composition as defined in claim 4 meets the above requirements. It is particularly suitable as a ceramic color composition for a back light glass and a side light glass for automobiles. It contains no lead, it has an excellent release property, and the pressing bending processing can be carried out at a temperature of from 630 to 700° C.

Further, as a ceramic color composition to be used for a glass plate which is subjected to a pressing bending processing, as mentioned above, a ceramic color composition containing no lead, having a good release property and sulfuric acid resistance, and preventing the decrease in strength of the glass plate at the time of baking, has been strongly demanded. The ceramic color composition as defined in Claim 5 meets the above requirements. It is particularly suitable as a ceramic color composition for a back light glass and a side light glass for automobiles. It contains no lead, it has an excellent release property and acid resistance, and the pressing bending processing can be carried out at a temperature of from 630 to 700° C.

Heretofore, as a ceramic color composition to be used for a glass plate for roofs of automobiles, one employing an amorphous glass powder of $SiO_2$—PbO type, has been used. The roof glass locates over a driver and passengers, and accordingly a glass plate having a higher strength has been demanded. The ceramic color composition as defined in Claim 6 meets the above requirements, and it is particularly suitable as a ceramic color composition for roof glass for automobiles. It has a small decrease in strength, and the pressing bending processing can be carried out at a temperature of from 630 to 700° C.

The ceramic color composition of the present invention is preferably formed into a paste (ink), to coat on a glass plate by screen printing. Accordingly, the weight average particle size of the powders of the above materials except the whisker-like refractory filler, is preferably within a range of from 0.1 to 15 μm. If the weight average particle size is smaller than 0.1 μm, productivity in the production step of each powder tends to be substantially poor, whereby the obtained ceramic color composition tends to be expensive. Preferably it is at least 1 μm. On the other hand, if the weight average particle size is larger than 15 μm, bulky particles will not pass through the screen, whereby the screen printing properties of the paste tends to be poor. Preferably it is at most 6 μm.

As the ceramic color composition of the present invention is coated on the glass surface, a vehicle containing an organic binder is contained in the ceramic color composition containing the above components, followed by forming into a paste. As the vehicle containing an organic binder, one having a high polymer material such as ethyl cellulose, an acrylic resin, a styrene resin, a phenol resin or a butyral resin as a binder dissolved in a solvent such as α-terpineol, butylcarbitol acetate or phthalic acid ester, may, for example, be preferably used. The concentration of the organic binder in the organic vehicle, is usually from 3 to 15 wt %, and the organic binder as a solid content is preferably from 0.5 to 20 parts by weight, more preferably from 3 to 20 parts by weight, based on 100 parts by weight of inorganic components in the composition.

The pasted ceramic color composition (ceramic color paste) of the present invention thus prepared is coated, for example, on a desired portion of a glass plate surface of soda lime silica glass to be used for a conventional window glass for automobiles by means of e.g. screen printing. The portion to be coated is, for example, around the periphery of a front windshield glass, a side light glass, a back light glass or a roof glass, in the case of the glass plate for automobiles.

Now, an example of the process for producing a curved glass plate employing the ceramic color composition of the present invention will be explained. A glass plate having the ceramic color composition of the present invention coated thereon is dried, and put in a heating furnace followed by heating. The heating temperatures is usually from 500 to 620° C., and the ceramic color composition is fused to the glass plate at this temperature. Then, the glass plate is kept at a temperature of from 570 to 600° C. or from 600 to 700° C., and the ceramic color composition of the present invention fused is baked on the glass plate. The baking is carried out preferably at a temperature of from 570 to 650° C. in the bending processing by gravity, and at a temperature of from 630 to 700° C. in a pressing bending processing. The coefficient of thermal expansion (average coefficient of linear expansion at a temperature of from 50 to 350° C.) is preferably from $40 \times 10^{-7}$/° C. to $90 \times 10^{-7}$/° C. When the glass powder in the composition is a crystalline glass powder, by controlling the composition of glass, the glass powder can be crystallized at this temperature range.

Then, in the pressing bending processing, the glass plate is subjected to the bending processing by a pressing apparatus (heating pressing apparatus) depending upon the desired shape of the window glass for automobiles, and the ceramic color composition of the present invention is baked on the glass plate at this time. In the bending processing by gravity wherein bending processing is carried out by a bending apparatus by gravity, the glass plate is subjected to the bending processing during the baking of the ceramic color composition of the present invention on the glass plate. Further, based on safety standards required for a window glass for automobiles, tempering against wind and coolness may be carried out, in some cases.

Now, the present invention will be described in further detail with reference to Examples. However, it should be understood that the present invention is by no means restricted to such specific Examples.

EXAMPLES 1 TO 18

Starting materials were prepared and mixed so that the composition of glass is as shown in Table 1 or 2 by mol%, and Table 3 or 4 by wt % (Examples 12 and 18 are shown in Table 3 or 4 alone), melted at a temperature of from 1,300 to 1,500° C., and quenched to obtain glass in a form of flakes. Then, the glass in a form of flakes was pulverized by a ball mill to obtain a glass powder having a weight average particle size of about 3.0 μm.

The glass powder, a heat-resistant black pigment powder (manufactured by Dainichiseika Color & Chemicals Mfg. Co., Ltd., No. 9510), a refractory filler (alumina) and a whisker-like refractory filler were mixed in a ratio (wt %) as shown in Table 3 or 4. Then, 20 parts by weight of a pine oil solution having 10 parts by weight of ethyl cellulose dissolved therein was added to 80 parts by weight of the mixed powder followed by kneading, and the mixture was uniformly dispersed by a three roll mill, and adjusted to have a desired paste viscosity, to obtain a ceramic color paste of the present invention. As the whiskers, the following was employed.

Whiskers (A) Aluminum borate (length: 5–30 μm, diameter: 0.3–5 μm)

(B) α-alumina (length: 10–50 μm, diameter: 0.1–5 μm)

(C) Potassium titanate (length: 10–50 μm, diameter: 0.1–5 μm)

The obtained ceramic color paste was printed on the whole area of a soda lime silica glass plate (composition: $SiO_2$: 72.5 wt %, $Na_2O$: 13.5 wt %, CaO: 8 wt %, MgO: 4 wt % and $Al_2O_3$: 1.5 wt % as the main components) of 100 mm×100 mm with a thickness of 3.5 mm by screen printing, followed by drying.

The glass plate was heated at 650° C. to bake the ceramic color paste on the glass plate. In examples in wherein a crystalline glass was used, crystallization was confirmed. Of the glass plate, strength (unit: kgf) (obtained from the load when the glass plate broke by static load applied at the center), softening point (unit: ° C.), coefficient of thermal expansion (unit:$\times 10^{-7}$/° C.) and crystallization temperature (crystallization peak temperature) (unit: ° C.) were measured. The results are shown in Tables 3 and 4. In Tables 3 and 4, the results of evaluation with respect to examples wherein a whisker-like refractory filler was not used, are also shown.

TABLE 1

| Composition | Examples | | | | | | | |
|---|---|---|---|---|---|---|---|---|
| No. | 1 | 2 | 3 | 4 | 5 | 6 | 7 | 8 |
| Composition of glass (mol %) | | | | | | | | |
| $SiO_2$ | 45.7 | 45.2 | 44.2 | 45.6 | 51.5 | 52.0 | 49.8 | 53.0 |
| ZnO | 17.3 | 17.8 | 18.8 | 20.2 | 3.0 | 3.2 | 2.8 | 1.7 |
| $B_2O_3$ | 13.2 | 14.7 | 13.9 | 14.5 | 12.5 | 13.0 | 12.7 | 14.5 |
| $Bi_2O_3$ | 4.8 | 4.2 | 4.1 | 3.8 | 0 | 0 | 0 | 0 |
| PbO | 0 | 0 | 0 | 0 | 20.0 | 19.2 | 21.7 | 18.2 |
| $CeO_2$ | 0 | 0.5 | 1.0 | 0 | 0 | 0 | 0 | 0 |
| $Li_2O$ | 7.9 | 8.0 | 9.8 | 9.3 | 2.5 | 2.3 | 1.7 | 3.8 |

TABLE 1-continued

| Composition | Examples | | | | | | | |
|---|---|---|---|---|---|---|---|---|
| No. | 1 | 2 | 3 | 4 | 5 | 6 | 7 | 8 |
| $Na_2O$ | 6.1 | 6.0 | 4.2 | 4.0 | 2.3 | 2.6 | 2.4 | 2.6 |
| $K_2O$ | 1.2 | 1.5 | 1.8 | 1.5 | 1.2 | 1.5 | 2.0 | 0 |
| $TiO_2$ | 1.8 | 1.2 | 1.2 | 1.3 | 4.1 | 4.0 | 3.9 | 3.0 |
| $ZrO_2$ | 1.6 | 0.9 | 1.0 | 0 | 1.2 | 1.5 | 1.1 | 1.5 |
| $Al_2O_3$ | 0.4 | 0 | 0 | 0 | 1.7 | 0.7 | 1.9 | 1.7 |
| F | 0 | 0 | 0 | 0 | 0 | 0 | 0 | 0 |

TABLE 2

| Composition | Examples | | | | | | | |
|---|---|---|---|---|---|---|---|---|
| No. | 9 | 10 | 11 | 13 | 14 | 15 | 16 | 17 |
| Composition of glass (mol %) | | | | | | | | |
| $SiO_2$ | 50.8 | 50.3 | 49.7 | 45.7 | 44.5 | 51.5 | 52.0 | 52.3 |
| ZnO | 0 | 0 | 0 | 15.3 | 18.8 | 0.3 | 3.2 | 0 |
| $B_2O_3$ | 4.9 | 5.5 | 4.9 | 13.2 | 13.7 | 12.5 | 13.0 | 5.5 |
| $Bi_2O_3$ | 0 | 0 | 0 | 4.8 | 4.2 | 0 | 0 | 0 |
| PbO | 34.4 | 34.6 | 34.4 | 0 | 0 | 22.7 | 19.2 | 34.6 |
| $CeO_2$ | 0 | 0 | 0 | 0.5 | 1.0 | 0 | 0 | 0 |
| $Li_2O$ | 1.5 | 1.3 | 1.3 | 10.6 | 8.0 | 2.5 | 2.3 | 2.5 |
| $Na_2O$ | 1.1 | 1.2 | 1.3 | 5.6 | 6.0 | 2.3 | 0 | 0 |
| $K_2O$ | 0 | 0 | 0 | 0 | 1.5 | 1.2 | 4.1 | 0 |
| $TiO_2$ | 2.8 | 3.0 | 8.9 | 3.0 | 1.9 | 4.1 | 4.0 | 1.6 |
| $ZrO_2$ | 1.8 | 1.6 | 1.4 | 1.0 | 0 | 1.2 | 1.5 | 3.0 |
| $Al_2O_3$ | 2.7 | 2.5 | 3.1 | 0.3 | 0.4 | 1.7 | 0.7 | 0.5 |
| F | 0 | 0 | 0 | 0 | 0 | 0 | 0 | 0 |

TABLE 3

| Composition | Examples | | | | | | | |
|---|---|---|---|---|---|---|---|---|
| No. | 1 | 2 | 3 | 4 | 5 | 6 | 7 | 8 |
| Composition of glass (wt %) | | | | | | | | |
| $SiO_2$ | 32.6 | 33.2 | 32.5 | 34.5 | 32.1 | 32.8 | 30.0 | 34.4 |
| ZnO | 16.7 | 17.7 | 18.7 | 20.7 | 2.5 | 2.7 | 2.3 | 1.5 |
| $B_2O_3$ | 10.9 | 12.5 | 11.8 | 12.7 | 9.0 | 9.5 | 8.9 | 10.9 |
| $Bi_2O_3$ | 26.6 | 23.9 | 23.4 | 22.3 | 0 | 0 | 0 | 0 |
| PbO | 0 | 0 | 0 | 0 | 46.2 | 45.0 | 48.5 | 43.8 |
| $CeO_2$ | 0 | 1.1 | 2.1 | 0 | 0 | 0 | 0 | 0 |
| $Li_2O$ | 2.8 | 2.9 | 3.6 | 3.5 | 0.8 | 0.7 | 0.5 | 1.2 |
| $Na_2O$ | 4.5 | 4.5 | 3.2 | 3.1 | 1.5 | 1.7 | 1.5 | 1.7 |
| $K_2O$ | 1.3 | 1.7 | 2.1 | 1.8 | 1.2 | 1.5 | 1.9 | 0 |
| $TiO_2$ | 1.7 | 1.2 | 1.2 | 1.3 | 3.4 | 3.4 | 3.1 | 2.6 |
| $ZrO_2$ | 2.3 | 1.4 | 1.5 | 0 | 1.5 | 1.9 | 1.4 | 2.0 |
| $Al_2O_3$ | 0.5 | 0 | 0 | 0 | 1.8 | 0.8 | 1.9 | 1.9 |
| F | 0 | 0 | 0 | 0 | 0 | 0 | 0 | 0 |
| *1 | | | | | | | | |
| Glass | 70 | 70 | 70 | 70 | 75 | 70 | 72 | 75 |
| Heat-resistant pigment | 18 | 18 | 18 | 18 | 15 | 15 | 18 | 11 |
| Alumina | 5 | 5 | 5 | 5 | 5 | 5 | 3 | |
| Whiskers | 7 (A) | 7 (B) | 7 (A) | 7 (C) | 5 (A) | 10 (B) | 7 (B) | 9 (B) |
| Glass plate strength | 74 | 72 | 72 | 69 | 75 | 78 | 72 | 74 |
| Softening point | 555 | 558 | 560 | 564 | 560 | 562 | 558 | 562 |
| Coefficient of thermal expansion | 80 | 78 | 77 | 76 | 72 | 70 | 75 | 70 |

*1 Composition of inorganic components

TABLE 4

| Composition | Examples | | | | | | | | | |
|---|---|---|---|---|---|---|---|---|---|---|
| No. | 9 | 10 | 11 | 12 | 13 | 14 | 15 | 16 | 17 | 18 |
| Composition of glass (wt %) | | | | | | | | | | |
| $SiO_2$ | 25.6 | 25.3 | 25.0 | 33.1 | 33.1 | 32.5 | 30.8 | 32.5 | 26.5 | 33.1 |
| ZnO | 0 | 0 | 0 | 32.7 | 15.0 | 18.6 | 0.2 | 2.7 | 0 | 32.7 |
| $B_2O_3$ | 2.9 | 3.2 | 2.9 | 3.5 | 11.1 | 11.6 | 8.7 | 9.4 | 3.2 | 3.5 |
| $Bi_2O_3$ | 0 | 0 | 0 | 23.4 | 27.0 | 23.8 | 0 | 0 | 0 | 23.4 |
| PbO | 64.5 | 64.7 | 64.4 | 0 | 0 | 0 | 50.5 | 44.6 | 65.1 | 0 |
| $CeO_2$ | 0 | 0 | 0 | 0 | 1.0 | 2.1 | 0 | 0 | 0 | 0 |
| $Li_2O$ | 0.4 | 0.3 | 0.3 | 2.0 | 3.8 | 2.9 | 0.7 | 0.7 | 0.6 | 2.0 |
| $Na_2O$ | 0.6 | 0.6 | 0.7 | 4.1 | 4.2 | 4.5 | 1.4 | 0 | 0 | 41 |
| $K_2O$ | 0 | 0 | 0 | 0 | 0 | 1.7 | 1.1 | 4.0 | 0 | 0 |
| $TiO_2$ | 1.9 | 2.0 | 2.6 | 0 | 2.9 | 1.8 | 3.3 | 3.3 | 1.1 | 0 |
| $ZrO_2$ | 1.9 | 1.7 | 1.4 | 0 | 1.5 | 0 | 1.5 | 1.9 | 3.1 | 0 |
| $Al_2O_3$ | 2.3 | 2.1 | 2.7 | 0 | 0.4 | 0.5 | 1.7 | 0.7 | 0.4 | 0 |
| F | 0 | 0 | 0 | 1.2 | 0 | 0 | 0 | 0 | 0 | 1.2 |
| *1 | | | | | | | | | | |
| Glass | 75 | 73 | 80 | 70 | 70 | 70 | 75 | 75 | 70 | 70 |
| Heat-resistant pigment | 13 | 15 | 13 | 23 | 25 | 30 | 20 | 25 | 25 | 25 |
| Alumina | 5 | 5 | 2 | 0 | 5 | 0 | 5 | 0 | 5 | 5 |
| Whiskers | 7 (A) | 7 (B) | 5 (C) | 7 (A) | 0 | 0 | 0 | 0 | 0 | 0 |
| Glass plate strength 1 | 72 | 73 | 71 | 69 | 52 | 46 | 62 | 60 | 62 | 55 |
| Softening point | 575 | 574 | 577 | 560 | 556 | 560 | 560 | 565 | 570 | 560 |
| Coefficient of thermal | 72 | 71 | 72 | 72 | 79 | 77 | 76 | 73 | 71 | 85 |

TABLE 4-continued

| Composition | Examples | | | | | | | | | |
|---|---|---|---|---|---|---|---|---|---|---|
| No. | 9 | 10 | 11 | 12 | 13 | 14 | 15 | 16 | 17 | 18 |
| expansion Crystallization temp. | — | — | — | 595 | — | — | — | — | — | 595 |

*1 Composition of inorganic components

As evident from Tables 3 and 4, in Examples wherein a whisker-like refractory filler was used, the glass plate strength was at least 65 kgf, whereas in Examples wherein the whisker-like refractory filler was not used, it was at most 62 kgf. Namely, the ceramic color composition of the present invention has an effect to improve the strength of a glass plate.

EXAMPLES 19 TO 32

Starting materials were prepared and mixed so that the composition of glass is as shown in Table 5 or 6 (unit: wt %) and melted at a temperature of from 1,250 to 1,350° C. for vitrification, to obtain a crystalline glass. Then, pulverization by a ball mill was carried out to obtain a crystalline glass powder having a weight average particle size of about 3 μm. The crystalline glass powder, a heat-resistant black pigment (manufactured by Nippon Fero, 42-302A), a heat-resistant filler (alumina) powder and whiskers (manufactured by Shikoku Corporation, Arborex (above-described aluminum borate whiskers)) were mixed with a weight ratio as shown in "Composition of inorganic components" in Table 5 or 6.

15 Parts by weight of an α-terpineol solution having 10 wt % of ethyl cellulose dissolved therein was added to 85 parts by weight of the mixed powder followed by kneading, and the mixture was uniformly dispersed by a three roll mill, and adjusted to have a desired paste viscosity. The paste thus obtained was printed on the whole surface of a soda-lime silica glass plate (thickness: 3.5 mm, 10 cm×10 cm) by screen printing, followed by drying. The glass plate was heated at a temperature of 670° C. for 4 minutes for baking, followed by cooling to room temperature, to obtain a sample.

The color tone of the sample from the glass surface was measured by using a color-difference calorimeter (manufactured by Minolta Co., Ltd., CR-200). Further, the sample was immersed in 0.1 N sulfuric acid at 80° C. for 140 hours, to obtain a color difference (ΔE) before and after the immersion by measuring the color tone from the glass surface, to evaluate sulfuric acid resistance. Further, the sample was fixed on a cylindrical jig of 100 mm in diameter so that the printed surface faced down, and a load was applied on the center of the glass plate from above, whereupon breaking load was measured.

Then, the glass plate having the ceramic color paste printed thereon followed by drying was heated at 670° C. for 4 minutes, and pressed by using a pressing mold installed in the furnace, to evaluate a release property.

The results of the above evaluations are shown in Tables 5 and 6. The color tone, the sulfuric acid resistance and the release property were evaluated based on the following standard; ⊚: excellent, ○: good, Δ: poor, X: very poor. Further, the glass plate strength (unit: kgf), the softening point (unit: ° C.), the coefficient of thermal expansion (unit:×10$^{-7}$/° C.) and the crystallization temperature (unit: ° C.) were measured in the same manner as mentioned above. In Examples 30 and 31, the composition was not sintered by the baking of at 670° C., and a sample for measuring the coefficient of thermal expansion could not be obtained, whereby the coefficient of thermal expansion could not be measured.

As evident from Tables 5 and 6, with the ceramic color composition of the present invention, color tone and sulfuric acid resistance are excellent, and strength of the glass plate and the release property will not deteriorate.

TABLE 5

| Composition | Examples | | | | | | | | | |
|---|---|---|---|---|---|---|---|---|---|---|
| No. | 19 | 20 | 21 | 22 | 23 | 24 | 25 | 26 | 27 | 28 |
| Composition of glass (wt %) | | | | | | | | | | |
| SiO$_2$ | 24.7 | 19.4 | 16.2 | 17.8 | 18.5 | 19.8 | 19.1 | 31.8 | 28.6 | 29.7 |
| B$_2$O$_3$ | 0 | 6.9 | 6.5 | 6.3 | 3.3 | 3.5 | 3.5 | 0 | 0 | 0 |
| Bi$_2$O$_3$ | 63.9 | 69.4 | 71.1 | 68.9 | 66.2 | 65 | 71.1 | 54.8 | 61.6 | 59.8 |
| BaO | 0 | 0 | 3.6 | 7 | 10.9 | 11.7 | 5.9 | 0 | 0 | 0 |
| Li$_2$O | 1.8 | 0.8 | 0.7 | 0 | 1.1 | 0 | 0.4 | 2.3 | 4.2 | 4.2 |
| Na$_2$O | 1.8 | 15 | 0 | 0 | 0 | 0 | 0 | 4.8 | 0 | 0.4 |
| K$_2$O | 2.9 | 0 | 0 | 0 | 0 | 0 | 0 | 0 | 0 | 0 |
| TiO$_2$ | 4.9 | 2 | 1.9 | 0 | 0 | 0 | 0 | 6.3 | 5.6 | 5.9 |
| F | 0 | 0 | 0 | 0 | 0 | 0 | 0 | 0 | 0 | 0 |
| Total *1 | 100 | 100 | 100 | 100 | 100 | 100 | 100 | 100 | 100 | 100 |
| Glass powder Heat- | 70 | 70 | 70 | 70 | 70 | 70 | 70 | 70 | 70 | 70 |

TABLE 5-continued

| Composition | Examples | | | | | | | | | |
|---|---|---|---|---|---|---|---|---|---|---|
| No. | 19 | 20 | 21 | 22 | 23 | 24 | 25 | 26 | 27 | 28 |
| resistant pigment | 20 | 25 | 25 | 25 | 25 | 25 | 25 | 23 | 23 | 25 |
| Alumina | 5 | 3 | 3 | 2 | 2 | 2 | 2 | 0 | 0 | 0 |
| Whiskers | 5 | 2 | 2 | 3 | 3 | 3 | 3 | 7 | 7 | 5 |
| Properties | | | | | | | | | | |
| Color tone | ○ | ◉ | ◉ | ○ | ◉ | ○ | ○ | ○ | ○ | ◉ |
| Sulfuric acid resistance | ◉ | ○ | ○ | ○ | ○ | ○ | ○ | ◉ | ○ | ( |
| Glass plate strength | 46 | 53 | 52 | 50 | 56 | 45 | 43 | 56 | 45 | 50 |
| Release property | ◉ | ◉ | ◉ | ◉ | ○ | ◉ | ○ | ○ | ◉ | ◉ |
| Softening point | 532 | 539 | 537 | 556 | 548 | 602 | 550 | 580 | 560 | 560 |
| Coefficient of thermal expansion | 86 | 82 | 82 | 88 | 82 | 88 | 88 | 84 | 91 | 89 |
| Crystalli- aztion temp. | 604 | 617 | 613 | 637 | 620 | 676 | 613 | 686 | 630 | 632 |

*1 Composition of inorganic components

TABLE 6

| Examples | 29 | 30 | 31 | 32 |
|---|---|---|---|---|
| Composition of glass (wt %) | | | | |
| $SiO_2$ | 12.9 | 38.9 | 42.9 | 29.7 |
| $B_2O_3$ | 0 | 0 | 0 | 0 |
| $Bi_2O_3$ | 80.1 | 44.7 | 48#6 | 59.8 |
| BaO | 3.9 | 0 | 0 | 0 |
| $Li_2O$ | 0.3 | 2.9 | 3.4 | 4.2 |
| $Na_2O$ | 0 | 5.8 | 0.3 | 0.4 |
| $K_2O$ | 0 | 0 | 0 | 0 |
| $TiO_2$ | 2.8 | 7.7 | 4.8 | 5.9 |
| F | 0 | 0 | 0 | 0 |
| Total | 100 | 100 | 100 | 100 |
| *1 | | | | |
| Glass powder | 70 | 70 | 70 | 70 |
| Heat-resistant pigment | 0 | 0 | 0 | 30 |
| Alumina | 5 | 2 | 3 | 0 |
| Whiskers | 2 | 3 | 3 | 0 |
| Properties | | | | |
| Color tone | x | x | x | ◉ |
| Sulfuric acid resistance | x | x | x | ◉ |
| Glass plate strength | 29 | 58 | 54 | 15 |
| Release property | ○ | ○ | ○ | ◉ |
| Softening point | 456 | 610 | 640 | 560 |
| Coefficient of thermal expansion | 102 | — | — | 110 |
| Crystallization temp. | 514 | 730 | 780 | 632 |

*1 Composition of inorganic components

Among the above Examples 1 to 32, Examples 1 to 12 and Examples 19 to 31 are Working Examples, and Examples 13 to 18 and Example 32 are Comparative Examples.

The ceramic color composition of the present invention has an effect to improve the strength of a glass plate employing it. By using the ceramic color composition of the present invention, the strength of glass can be improved, and in addition, a colored opaque layer containing no lead, and being excellent in release property and acid resistance, can be obtained. Further, by using the ceramic color composition employing a glass powder containing lead, a colored opaque layer being excellent in release property and acid resistance, can be obtained, without decreasing the strength of roof glass. Further, according to the present invention, a curved window glass for vehicles having a colored opaque layer and being excellent in strength, can be produced at a low cost.

What is claimed is:

1. A ceramic color composition which comprises: from 5 to 40 wt. % of a heat-resistant color pigment powder, from 50 to 94.5 wt. % of a glass powder containing $SiO_2$ in an amount of 10 to 45 wt %, from 0 to 25 wt. % of a refractory filler, and from 0.1 to 40 wt. % of at least one whisker shaped refractory filler selected from the group consisting of aluminum borate whiskers, zinc oxide whiskers, $Na_2Ca_2P_2O_{18}$ whiskers, magnesium oxide whiskers, magnesium borate whiskers, basic magnesium sulfate ($MgSO_4.MgO.8H_2O$) whiskers and titanium diboride whiskers.

2. The ceramic color composition according to claim 1, wherein the whiskershaped refractory filler is needle crystals having Et length of from 0.5 to 100 μm and a diameter of from 0.1 to 10 μm.

3. The ceramic color composition according to claim 1, wherein the composition of the glass powder comprises:
$SiO_2$: 10–45 wt %
ZnO: 10–25 wt %
$B_2O_3$: 0–15 wt %
$Bi_2O_3$: 15–40 wt %
$CeO_2$: 0–5 wt %
MgO: 0–5 wt %
CaO: 0–5 wt %
BaO: 0–5 wt %
$Li_2O$: 0–10 wt %
$Na_2O$: 0–10 wt %
$K_2O$: 0–10 wt %
$TiO_2$: 0–5 wt %
$ZrO_2$: 0–5 wt %
$Al_2O_3$: 0–5 wt %, and
F: 0–2 wt %.

4. The ceramic color composition according to claim 1, wherein the composition of the glass powder comprises:
$SiO_2$: 10–45 wt %
ZnO: more than 25–45 wt %
$B_2O_3$: 0–10 wt %
$Bi_2O_3$: 15–40 wt %
$CeO_2$: 0–5 wt %
MgO: 0–5 wt %
CaO: 0–5 wt %
BaO: 0–5 wt %
$Li_2O$: 0–10 wt %
$Na_2O$: 0–10 wt %
$K_2O$: 0–10 wt %
$TiO_2$: 0–10 wt %
$ZrO_2$: 0–5 wt %
$Al_2O_3$: 0–5 wt %, and
F: 0–2 wt %;
and the glass powder is crystalline.

5. The ceramic color composition according to claim 1, wherein the composition of the glass powder comprises:
$SiO_2$: 10–36 wt %
$Bi_2O_3$: 50–75 wt %
$B_2O_3$: 0–8 wt %
BaO: 0–12 wt %
$CeO_2$: 0–2 wt %
$Li_2O$: 0–5 wt %
$Na_2O$: 0–5 wt %
$K_2O$: 0–3 wt %, and
$TiO_2$: 0–12 wt %;
and the glass powder is crystalline.

6. The ceramic color composition according to claim 1, wherein the composition of the glass powder comprises:
$SiO_2$: 10–40 wt %
ZnO: 0–10 wt %
$B_2O_3$: 0–15 wt %
PbO: 40–70 wt %
$CeO_2$: 0–2 wt %
MgO: 0–5 wt %
CaO: 0–5 wt %
BaO: 0–5 wt %
$Li_2O$: 0–5 wt %
$Na_2O$: 0–5 wt %
$K_2O$: 0–5 wt %
$TiO_2$: 0–5 wt %
$ZrO_2$: 0–5 wt %
$Al_2O_3$: 0–5 wt %, and
F: 0–2 wt %.

7. A ceramic color paste which comprises an organic vehicle and the ceramic color composition as defined in claim 1.

8. A process for producing a curved glass plate, which comprises;
coating the ceramic color paste defined in claim 7 on a selected portion of a glass plate:
heating the glass plate to bake the ceramic color paste on the glass plate; and
forming the glass plate into a shaped object after or during the baking of the color paste.

* * * * *